US011872821B2

(12) United States Patent
Studer et al.

(10) Patent No.: US 11,872,821 B2
(45) Date of Patent: Jan. 16, 2024

(54) PRINTABLE LIQUID SUPPLY CARTRIDGES

(71) Applicant: Hewlett-Packard Development Company, L.P., Spring, TX (US)

(72) Inventors: Anthony D. Studer, Corvallis, OR (US); David Olsen, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/096,555

(22) Filed: Jan. 12, 2023

(65) Prior Publication Data

US 2023/0166518 A1 Jun. 1, 2023

Related U.S. Application Data

(63) Continuation of application No. 17/574,311, filed on Jan. 12, 2022, now Pat. No. 11,584,135, which is a continuation of application No. 16/771,308, filed as application No. PCT/US2018/063649 on Dec. 3, 2018, now Pat. No. 11,254,136.

(51) Int. Cl.
*B41J 2/175* (2006.01)

(52) U.S. Cl.
CPC ......... *B41J 2/1753* (2013.01); *B41J 2/17546* (2013.01)

(58) Field of Classification Search
CPC ...... B41J 2/175; B41J 2/17513; B41J 2/1752; B41J 2/17523; B41J 2/17526
USPC ........................................................... 347/86
See application file for complete search history.

(56) References Cited

U.S. PATENT DOCUMENTS

| | | | |
|---|---|---|---|
| 6,065,826 | A | 5/2000 | Robinson et al. |
| 6,203,147 | B1 | 3/2001 | Battey et al. |
| 7,744,202 | B2 | 6/2010 | Steinmetz et al. |
| 8,333,861 | B2 | 12/2012 | Camp |
| 8,591,014 | B2 | 11/2013 | Leiser et al. |
| 9,597,884 | B2 | 3/2017 | Nanjo et al. |
| 2002/0109761 | A1 | 8/2002 | Shimizu et al. |
| 2012/0056955 | A1 | 3/2012 | Kodama et al. |
| 2016/0200113 | A1 | 7/2016 | Nanjo et al. |
| 2018/0093483 | A1 | 4/2018 | Tomoguchi |

FOREIGN PATENT DOCUMENTS

| | | | |
|---|---|---|---|
| CN | 1252758 | A | 5/2000 |
| CN | 1370683 | A | 9/2002 |
| CN | 1385306 | A | 12/2002 |
| CN | 1860031 | A | 11/2006 |
| CN | 202283819 | U | 6/2012 |
| CN | 103153628 | A | 6/2013 |

(Continued)

*Primary Examiner* — Hoan H Tran
(74) *Attorney, Agent, or Firm* — Foley & Lardner LLP

(57) ABSTRACT

A printable liquid supply cartridge includes a printable liquid reservoir extending between a first side and a second side, and between a front end and a rear end. The front end includes a printable liquid outlet to receive a first fluid pen and a gas inlet, above the printable liquid outlet, to receive a second fluid pen. The front end also includes an interface support at the first side, the support having an I2C data interface that includes electrical connection pads exposed on an interior side of the support to face from the first side towards the second side, the electrical connection pads being arranged vertically and to make contact with the printer data interface at least partially inserted into the second portion.

20 Claims, 9 Drawing Sheets

(56) References Cited

FOREIGN PATENT DOCUMENTS

| | | | | |
|---|---|---|---|---|
| JP | 2004 209664 | | * | 7/2004 |
| JP | 2004 291475 | | * | 10/2004 |
| KR | 10-2016-0043015 | A | | 4/2016 |
| WO | 2012/054050 | A1 | | 4/2012 |
| WO | 2012/054112 | A1 | | 4/2012 |
| WO | 2017/189011 | A1 | | 11/2017 |

* cited by examiner

PRINTABLE LIQUID SUPPLY CARTRIDGES

CROSS-REFERENCE TO RELATED APPLICATIONS

This application is a continuation patent application that claims priority under 35 U.S.C. § 120 of U.S. patent application Ser. No. 17/574,311, filed Jan. 12, 2022, which is a continuation of U.S. patent application Ser. No. 16/771,308, filed Jun. 10, 2020, which is a National Stage Entry under 35 U.S.C. § 371 of International Application No. PCT/US18/063649, filed Dec. 3, 2018, the contents of all such applications being hereby incorporated by reference in their entirety and for all purposes as if completely and fully set forth herein.

BACKGROUND

Printable liquid supply cartridges are used to supply printable liquids, such as ink, for printing. Mechanical, electronic and fluidic interfaces may be provided to engage with, communicate with and supply printable liquid to a printer. WO2018/022038 (incorporated herein by reference) discloses a horizontal interface for a cartridge having a digital level sensor. WO2012/054050 (incorporated herein by reference) discloses a cartridge having structures for engaging with a printer.

BRIEF DESCRIPTION OF DRAWINGS

Examples will now be described, by way of non-limiting example, with reference to the accompanying drawings, in which.

DETAILED DESCRIPTION

Figure 1:
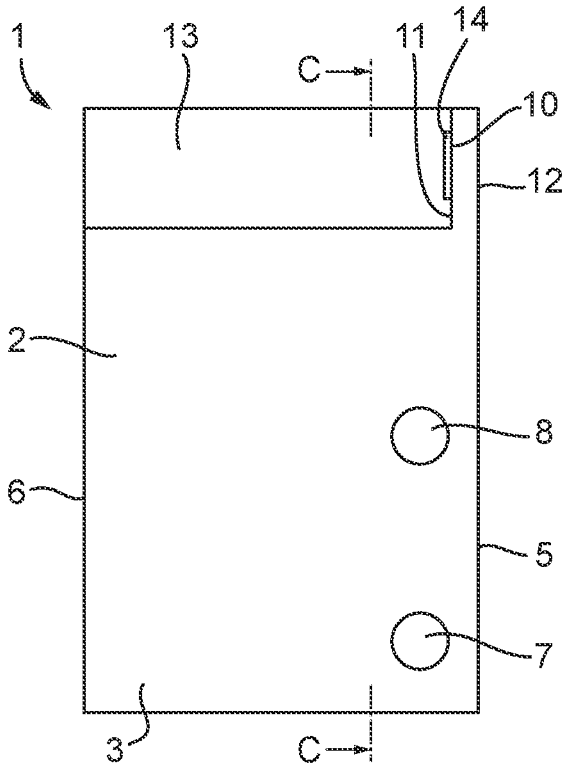
FIG. 1 is an example printable liquid supply cartridge.
Figure 2:
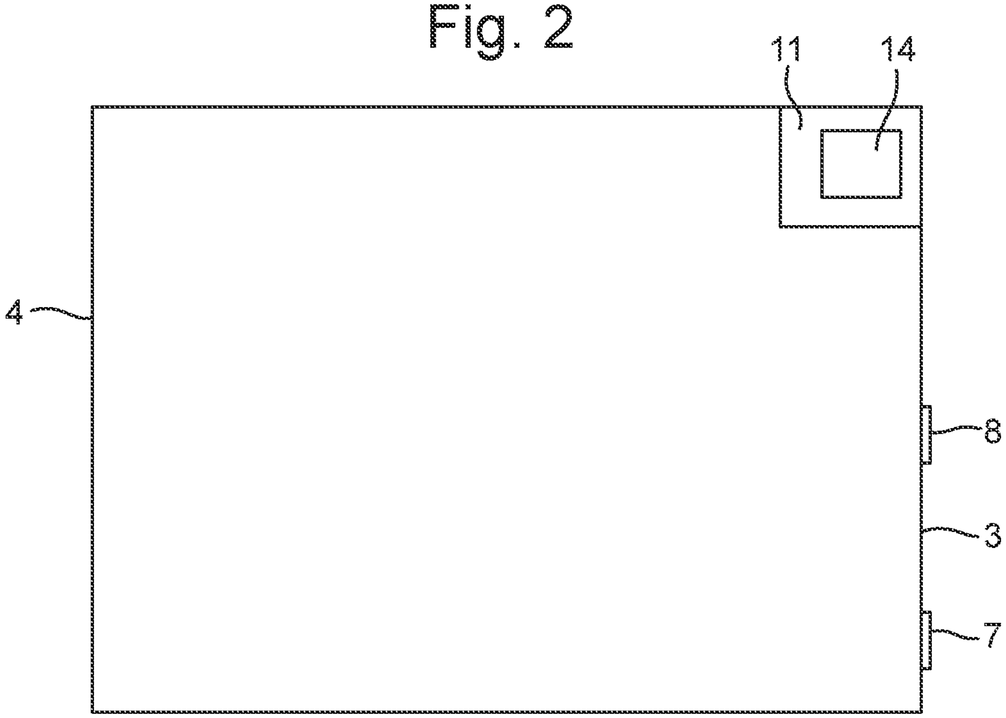
FIG. 2 is a cross-sectional view through the line C-C of FIG. 1.

FIG. 1 shows an example printable liquid supply cartridge 1. More particularly, FIG. 1 shows a plan view of the example cartridge 1. The cartridge 1 has a housing 2 which encloses an internal volume in which the printable liquid, such as ink, can be stored. The internal volume of the example cartridges described herein may be between approximately 10 millilitres to approximately 50 or approximately 100 millilitres. The housing 2 has a front end 3, a rear end 4 and first and second sides 5, 6 extending from the front end to the rear end. The front end 3 and the rear end 4 can be seen also in FIG. 2, which is a cross-sectional view through the line C-C of FIG. 1. The housing 2 may comprise two relatively hard plastic shells which directly contain the printable liquid therebetween. In the example, the height of the housing is greater than the width of the housing. Similarly, the height of the internal volume is greater than the width of the internal volume. The height of the internal volume is defined by substantially the height of the first and second sides and the width of the internal volume is defined by the distance between the first and second sides.

The front end 3 may have a printable liquid outlet 7 through which the printable liquid can be supplied to a printer, for example by insertion of a fluid pen of the printer therein. The printable liquid outlet 7 may be provided closer to the bottom than to the top of the front end 3.

A gas inlet 8 may be provided on the front end 3 also, to enable gas such as air to be supplied to the cartridge, for example by insertion of a fluid pen of the printer therein. The gas inlet 8 may be positioned above the printable liquid outlet 7.

A first wall 10 having an internal side 11 and an external side 12 may be provided to delimit a recess 13. In the example shown, the recess 13 extends from the first wall 10 across the entire width of the front end 3. The first wall 10 thus overhangs a notched corner of the housing. The external side 12 of the first wall 10 may be part of the first side 5 of the housing 2. Electrical connection pads 14 are exposed on the internal side of the first wall, as shown also in FIG. 2. The electrical connection pads are indicated by a single block in FIGS. 1 and 2. In one example there are at least three electrical connection pads, although fewer connection pads may be provided. The electrical connection pads may be arranged in a top to bottom direction. The electrical connection pads enable electrical signals to be communicated between electrical circuitry of the cartridge and electrical circuitry of the printer, for example in accordance with an I2C data communication protocol. Hence, the connection pads may form an I2C data interface. Providing the electrical connection pads 14 to the first wall 10 allows for easy mounting of the electrical connection pads 14 on the cartridge. Being positioned on the internal side 11, the electrical connection pads 14 are protected from damage when shipping and handling the cartridge. The recess 13 can receive an electrical connector of a printer to establish an electrical connection between the electrical connection pads 14 and the electrical connector.

Figure 3:
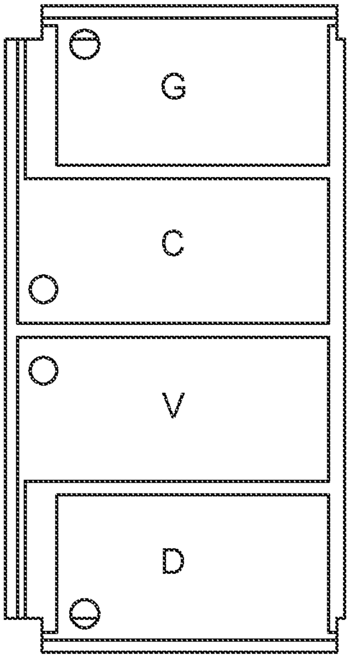
FIG. 3 is an example arrangement of electrical connection pads.

FIG. 3 shows an example arrangement of electrical connection pads. In this arrangement, four electrical connection pads include, from top to bottom, a ground connection pad G, a serial clock connection pad C, a supply voltage connection pad V, and a serial data input/output pad D.

Electrical circuitry may be provided in the cartridge 1 and connected to the electrical connection pads 14. The electrical circuitry may include an integrated circuit 40. The integrated circuit 40 may function as a microcontroller and store a secure key to authenticate communications to the printer through the I2C data interface. The integrated circuit may be attached to the first wall 10.

Figure 4:
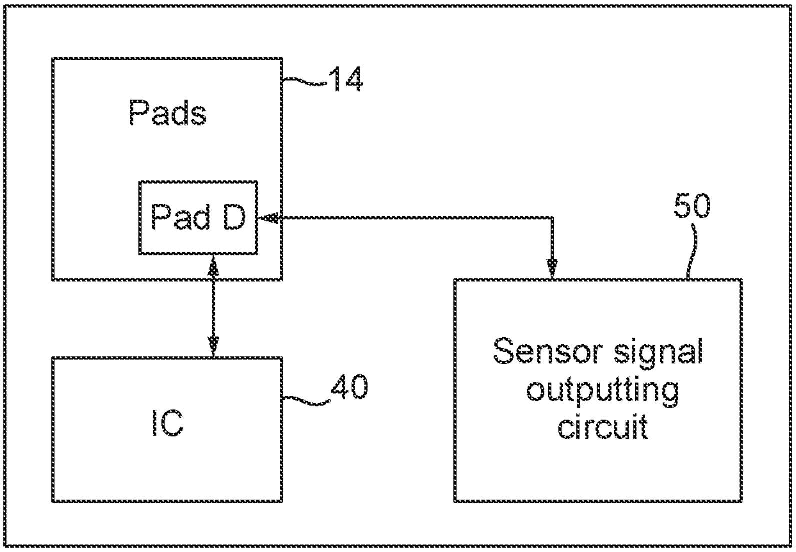
FIG. 4 shows example electronic circuitry of an example cartridge.

Alternatively or additionally, the electrical circuitry may include a sensor signal outputting circuit 50. This circuit may be connected to the I2C data interface. If the sensor signal outputting circuit and the integrated circuit are both provided, they may share the same data pad D to communicate through the I2C data interface with the printer. The sensor signal outputting circuit may return data readings through the shared data pad to the printer as a data communication secured differently than data communications from the integrated circuit to the printer through the shared data pad. For example, the data readings outputted by the sensor signal outputting circuit may be unsecured and the data communications from the integrated circuit may be secured. As an example of a sensor signal outputting circuit, liquid level sensing circuitry may be provided in the internal volume in which the printable liquid is present. Sharing the same data pad D helps achieve an efficient use of available space for the electrical connection pads 14. FIG. 4 shows an example integrated circuit 40 and sensor signal outputting circuit 50.

Figure 5:
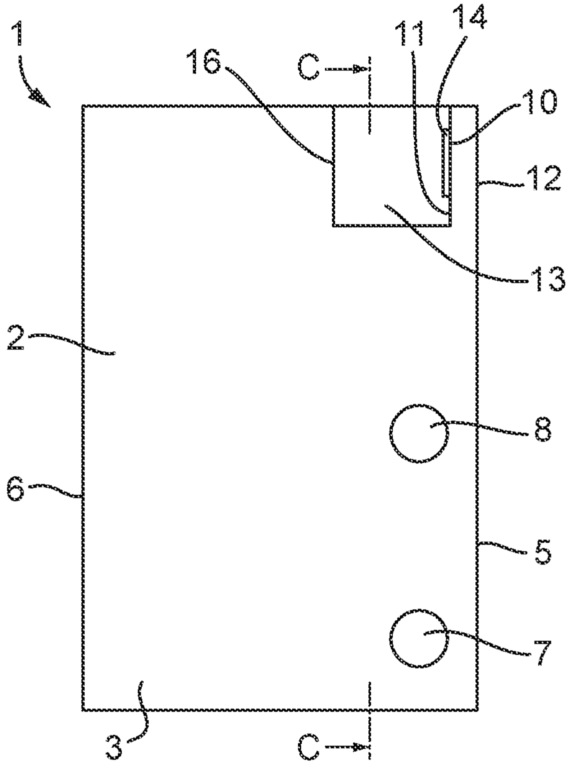
FIG. 5 is an example printable liquid supply cartridge.

FIG. 5 shows another example printable liquid supply cartridge. In particular, FIG. 5 shows a plan view of the cartridge 1. The example cartridge of FIG. 5 is similar to that of FIG. 1. In the example of FIG. 5, the recess 13 does not extend across the entire width of the front end 3. The recess 13 is delimited by a second wall 16. The recess 13 between the first wall 10 and the second wall 16 may receive an electrical connector of a printer therein to contact the electrical connection pads 14.

Figure 7:
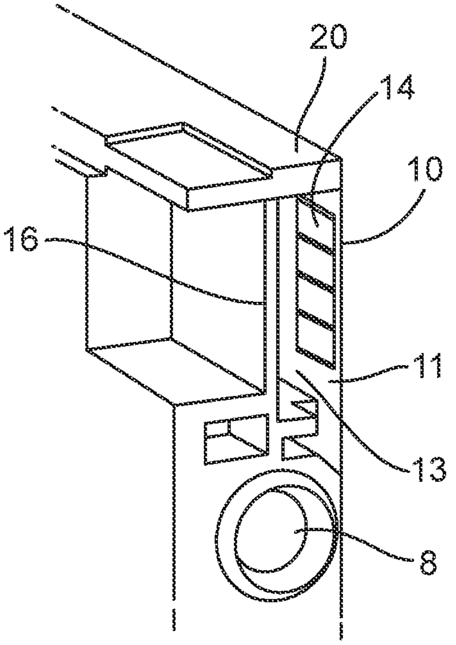
FIG. 7 is an enlarged view of part of the cartridge of FIGS. 6A and 6B.
Figure 6A:
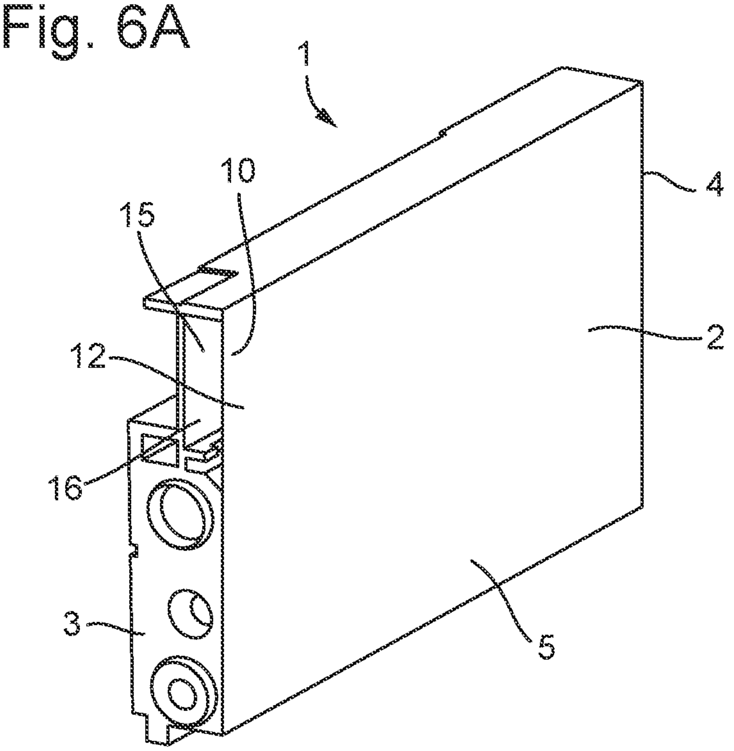
FIGS. 6A and 6B are perspective views of an example printable liquid supply cartridge.
Figure 6B:
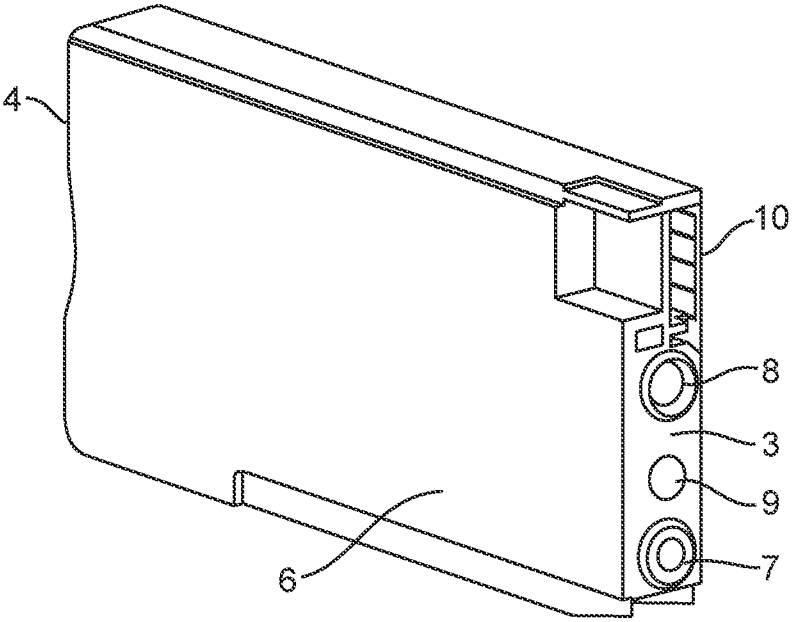

FIGS. 6A and 6B are perspective views of another example printable liquid supply cartridge 1. FIG. 7 is a magnified view of part of the cartridge. The same reference numerals are used for like parts. The cartridge 1 has a housing 2 which encloses an internal volume in which the printable liquid, such as ink, can be stored. The housing 2 has a front end 3, a rear end 4, and first and second sides 5, 6 extending from the front end to the rear end. A printable liquid outlet 7 and a gas inlet 8 may be provided on the front end. The printable liquid outlet 7 may be provided closer to the bottom than to the top of the front end 3. The gas inlet 8 may be positioned above the printable liquid outlet 7. The front end may also have a printable liquid inlet 9 to enable the cartridge to be filled or re-filled with printable liquid.

In the example of FIGS. 6A, 6B and 7, there may be provided a datum surface 15 across the recess from the internal side 11 of the first wall 10. In the example shown, the datum surface is a side of a second wall 16 facing towards the recess 13.

The datum surface 15 helps ensure smooth installation and removal of the printable liquid supply cartridge to and from a printer. This is explained with reference to FIGS. 8A to 8D below, which show an example of a cartridge being mounted to a slot of a printer.

Figure 8A:
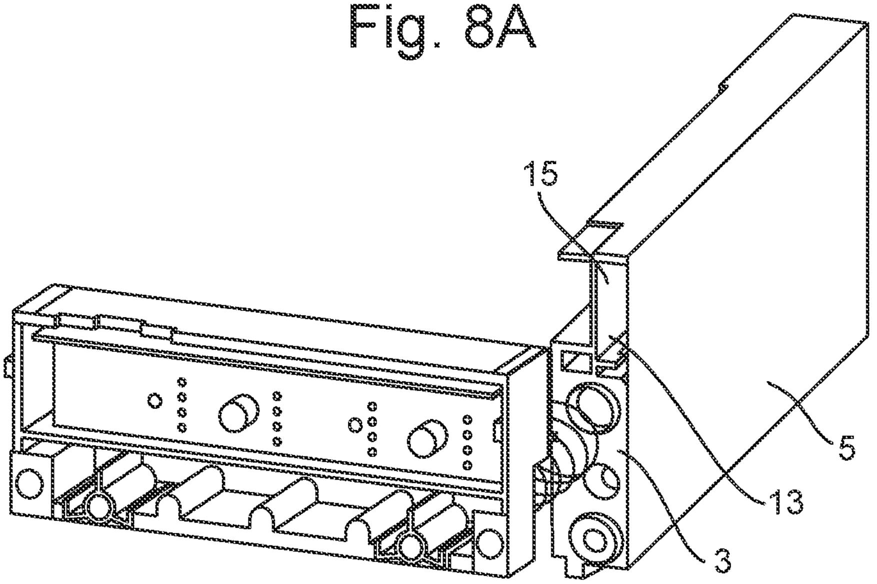
FIGS. 8A-8D show an example printable liquid supply cartridge at stages of attachment to a printer.
Figure 8B:
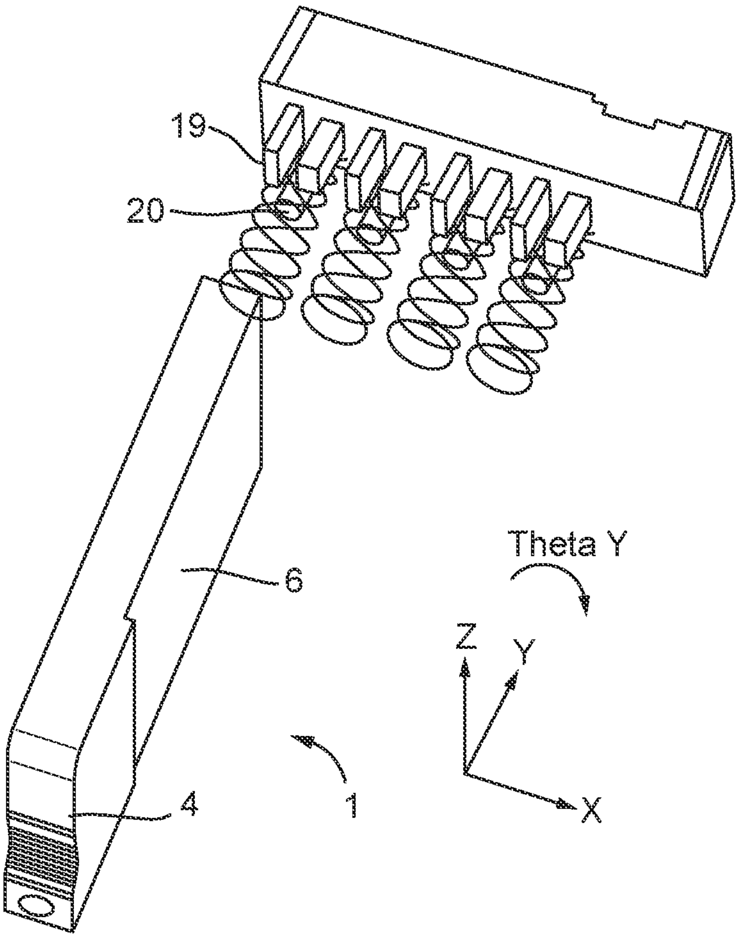
Figure 8C:
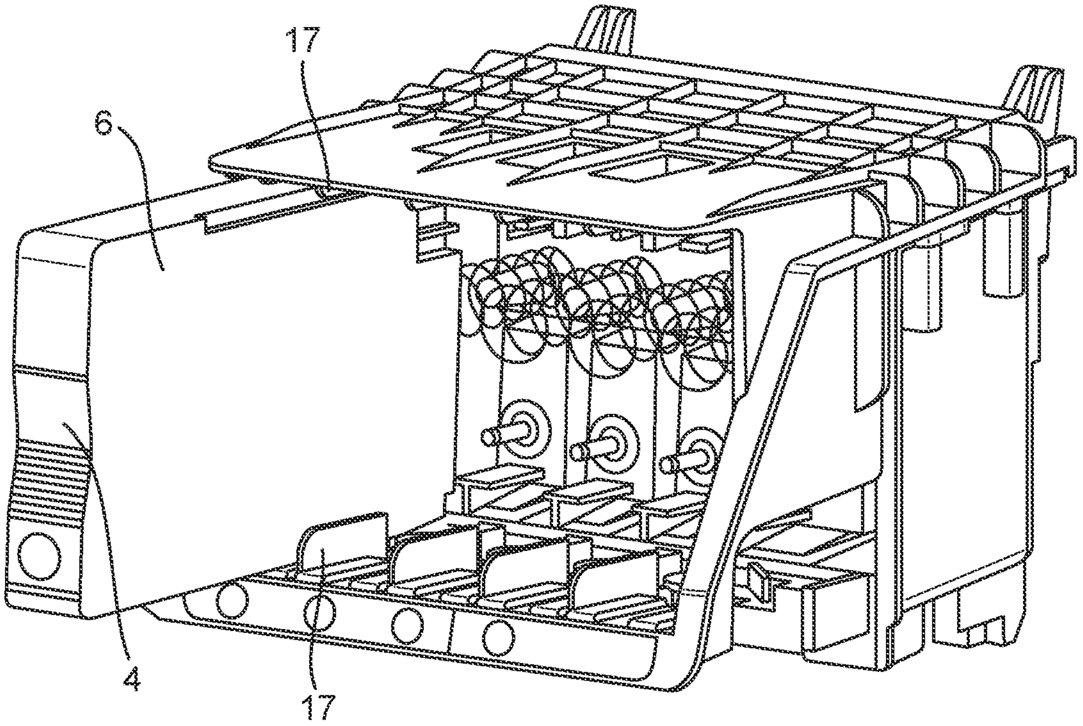
Figure 8D:
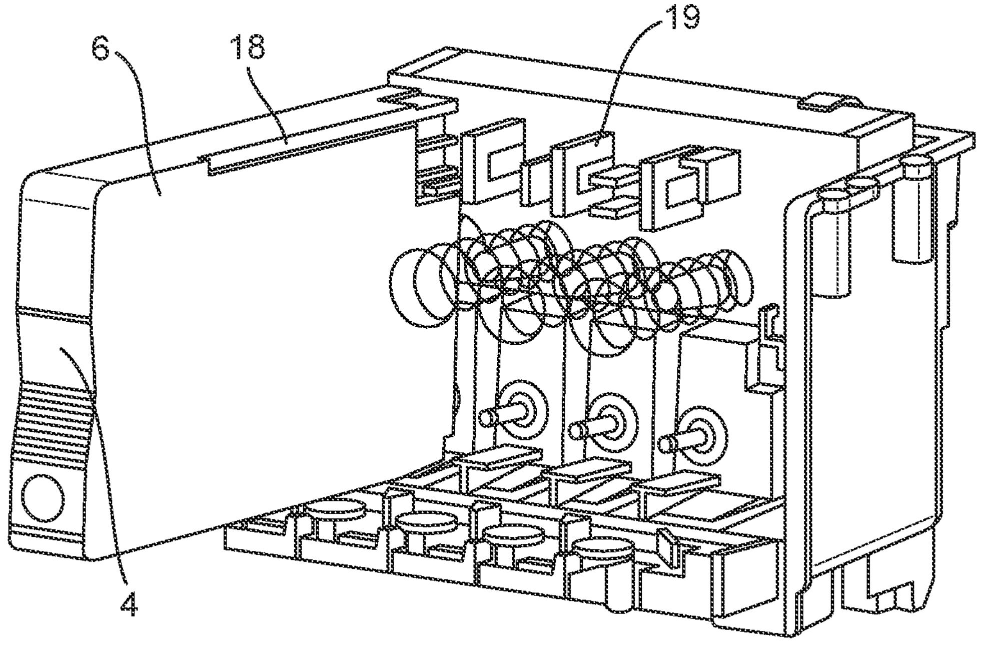

FIGS. 8A and 8B show the example cartridge 1 being aligned with a slot of the printer. The initial rough alignment may be aided by guide rails 17 provided on the printer and corresponding guide surfaces 18 on the cartridge, for example on at least one of top and bottom sides thereof, the top and bottom sides extending from the front end towards the rear end of the cartridge. Example guide rails and guide surfaces can be seen in FIGS. 8C and 8D. Note that FIG. 8D does not show the guide rails 17 of the printer.

In FIG. 8B, an example electrical connector 19 can be seen on the printer. An example fluid pen 20 to be received by the gas inlet 8 can be seen also. During connection of the cartridge to the printer, the recess 13 receives the electrical connector 19 of the printer and the electrical connection pads 14 on the internal side 11 of the first wall 10 contact the electrical connector 19. As the electrical connection pads 14 contact the electrical connector, this has a tendency to impart a force on the cartridge in a direction substantially perpendicular to a direction of insertion of the cartridge. In other words, in a direction substantially parallel to a widthwise direction of the example cartridge shown. In FIG. 8B, this direction is along the X axis and a force tends to be imparted on the cartridge in the negative X direction. This results in a negative Theta Y moment being imparted to the cartridge such that the cartridge rotates. The cartridge may therefore rotate about a longitudinal axis extending from the front end to the rear end. For example, the cartridge may rotate around the axis of the gas inlet, the fluid pen of the printer typically being flexible and tolerant of some misalignment. This rotation causes misalignment of the cartridge with the printer and the cartridge may become misaligned with the guide rails 17. As a result, the cartridge may not be fully installed or may appear to be installed but will leak due to the misalignment, and the cartridge may bind to the guide rails and not eject properly.

The datum surface 15 resists the above described rotation of the cartridge which would otherwise occur. In this example, the datum surface 15 contacts the opposite side of the electrical connector of the printer to that contacted by the electrical connection pads 14. Thus, the datum surface 15 acts against any tendency of rotation of the cartridge. It is noted that the electrical connection pads 14 may be resiliently biased towards the recess, for example by one or more springs. Any biasing of the electrical connection pads increases the rotation tendency of the cartridge but is counteracted by the datum surface 15.

Figure 9:
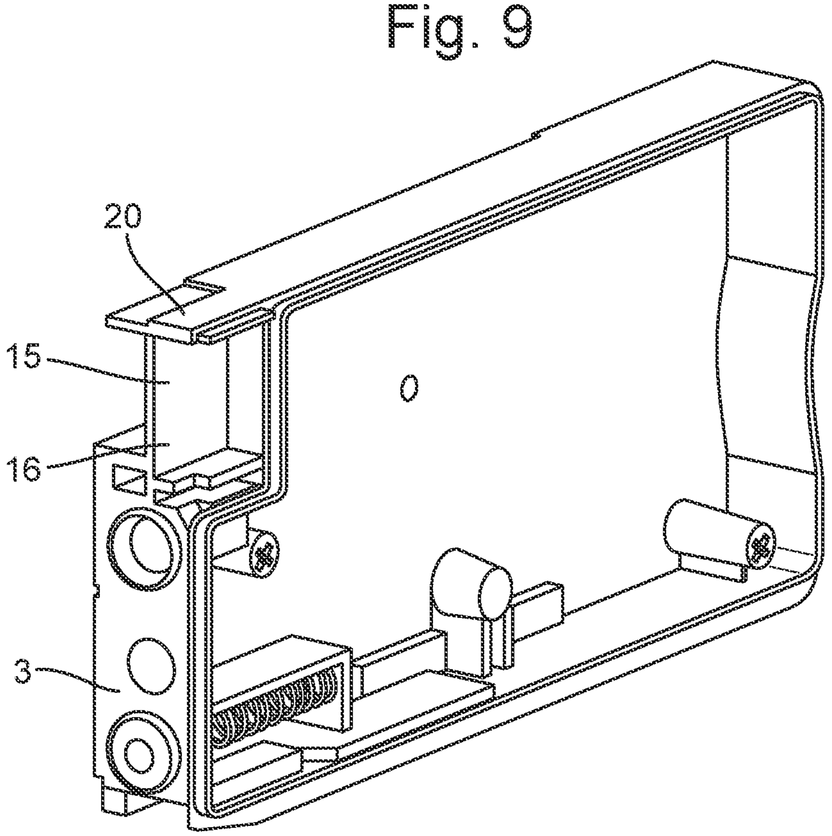
FIG. 9 is an example printable liquid supply cartridge with part of the housing not shown.

FIG. 9 is a perspective view of an example printable liquid supply cartridge with part of the housing not shown. In particular, the first side 5 and first wall 10 are not shown. In the example of FIG. 9, the datum surface 15 is a side of the second wall 16 facing towards the recess.

Figure 10:
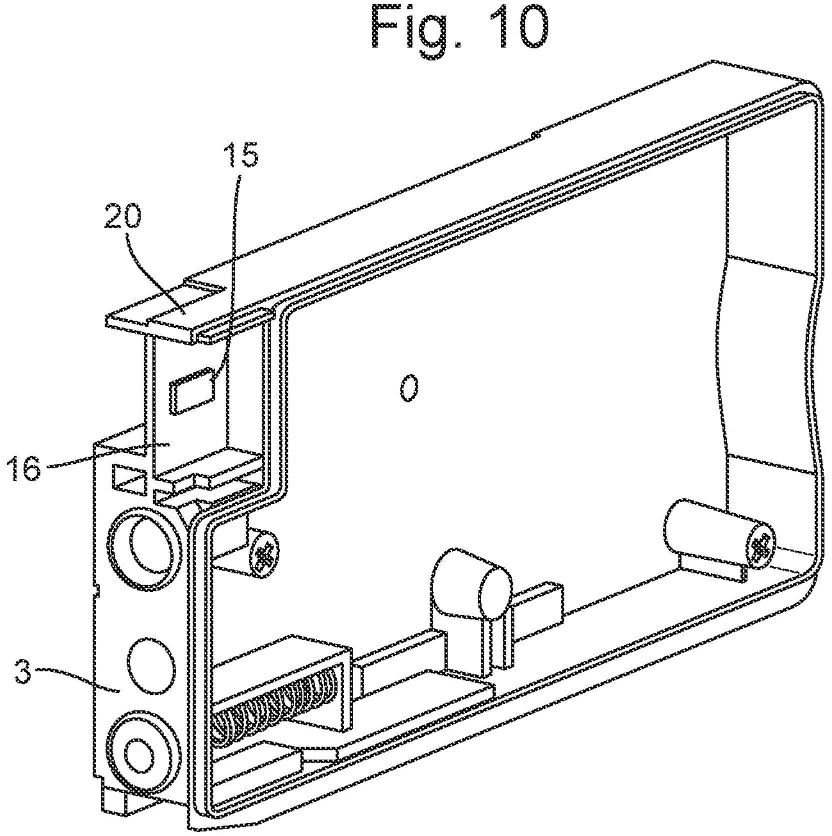
FIG. 10 is an example printable liquid supply cartridge with part of the housing not shown.

FIG. 10 is a perspective view of another example printable liquid supply cartridge with part of the housing not shown. In particular, the first side 5 and first wall 10 are not shown. In the example of FIG. 10, the datum surface 15 is provided as a projection on a second wall 16. The projection projects into the recess 13.

Figure 11:
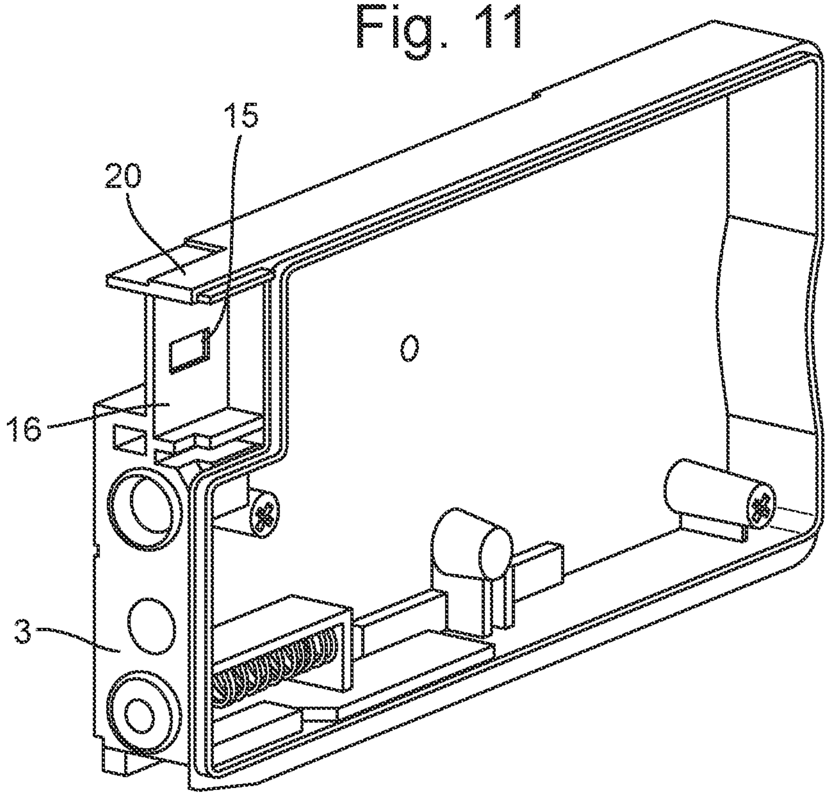
FIG. 11 is an example printable liquid supply cartridge with part of the housing not shown.

FIG. 11 is a perspective view of another example printable liquid supply cartridge with part of the housing not shown. In particular, the first side 5 and first wall 10 are not shown. In the example of FIG. 11, the datum surface 15 is an indentation in the second wall 16.

As described above, the datum surface 15 and the electrical connection pads 14 may be on opposed sides of a recess 13 to receive the electrical connector therebetween, however the datum surface 15 need not be provided on or as part of a second wall 16. It can otherwise be part of or extend from the housing to contact the electrical connector of the printer and resist rotation of the cartridge.

Figure 12:
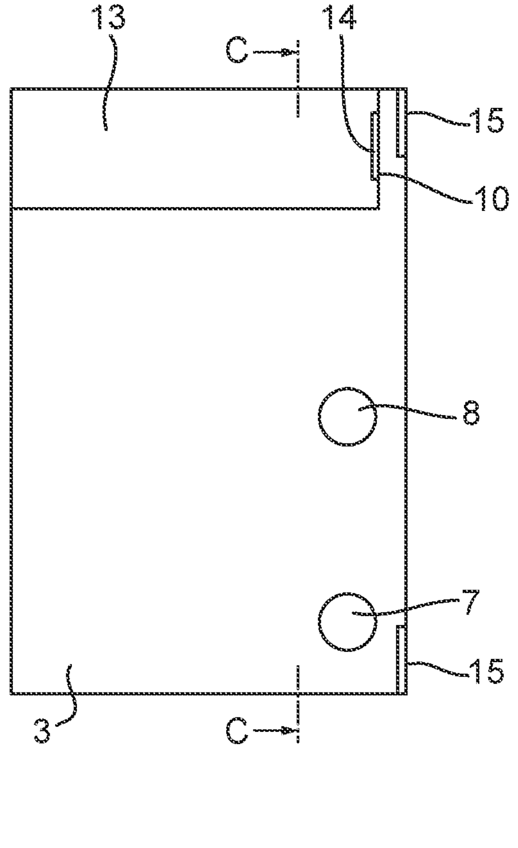
FIG. 12 is an example printable liquid supply cartridge.

Alternatively, the datum surface 15 may be part of or extend from the housing to contact a different element of the printer. An example is shown in FIG. 12. FIG. 12 shows a front end of an example cartridge similar to that of FIG. 1. In the example of FIG. 12, a first datum surface 15 is provided on the first wall 10 on the front end 3 and a second datum surface 15 is provided at the bottom of the front end 3 towards the first side 5. At least one of the first datum surface and the second datum surface may be provided.

In the example cartridges of FIGS. 6A to 12, as in the example cartridges of FIGS. 1 to 5, the electrical connection pads 14 enable electrical signals to be communicated to and from the cartridge, for example to be exchanged with a printer to which the cartridge is mounted. The communication may be in accordance with an I2C data communication protocol as described above. As already described above, the electrical connection pads 14 may include any of a ground connection pad G, a serial clock connection pad C, a supply voltage connection pad V and a serial data input/output pad D. As also already described above, the cartridge may further include at least one of an integrated circuit and a sensor signal outputting circuit.

In any of the above described example cartridges, a rib may be provided to support the first wall 10. An example rib 20 can be seen in FIG. 7. The rib may provide support to the first wall so as to protect that wall against deformation, for example if the cartridge is dropped during shipping or handling. This protects the electrical connection pads 14 and any integrated circuit also. The rib may be part of the housing 2. It may extend substantially perpendicularly to the first wall 10. It may be integral with the first wall 10. Alternatively, it may be joined to the first wall by a weld. The weld may comprise plastic material. The rib may also be joined to the second wall 16, if a second wall 16 is present. The rib functions also as a pre alignment feature to aid the user in aligning the cartridge and the printer, in particular in aligning the electrical connection pads 14 with the electrical connector.

Figure 13:
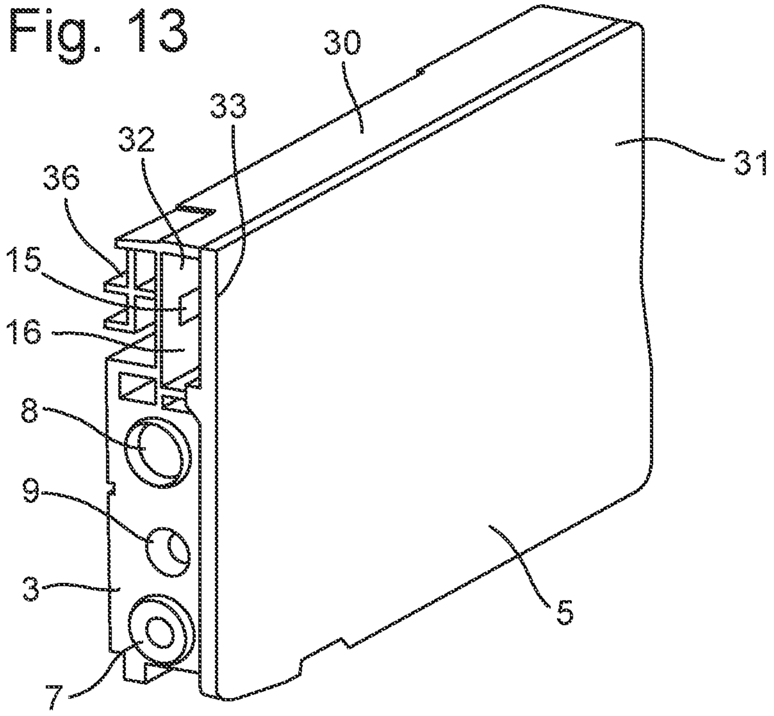
FIG. 13 is a perspective view of an example printable liquid supply cartridge.
Figure 14:
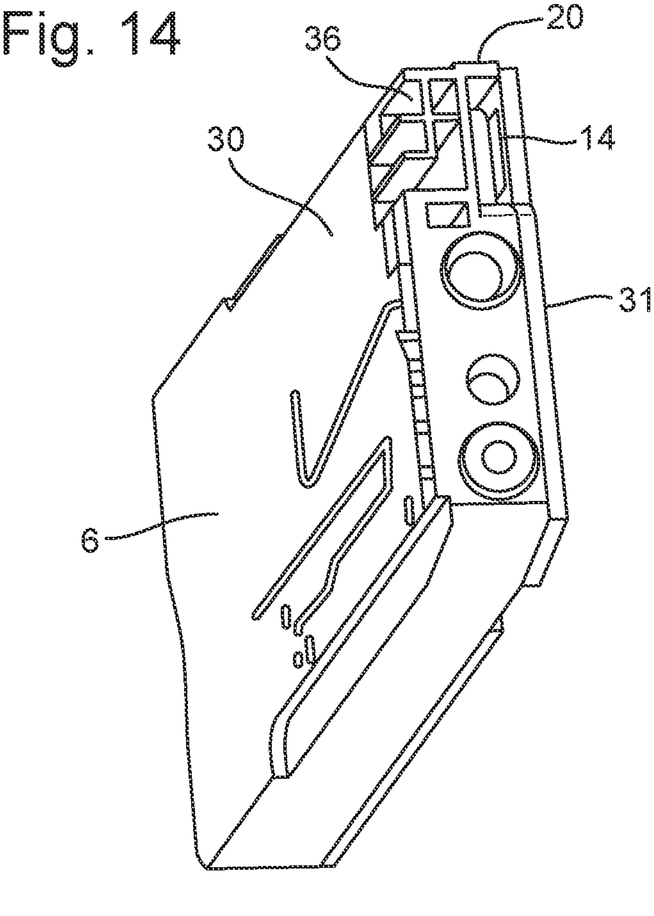
FIG. 14 is another perspective view of the example cartridge of FIG. 13.

FIGS. 13 and 14 are perspective views of another example printable liquid supply cartridge. The structure of the printable liquid supply cartridge is similar to that of the cartridges described above, and like parts are described with the same reference numerals. In the printable liquid supply cartridge of this example, the housing 2 includes a body 30 and a lid 31. The body has a notched corner 32 on the first side 5 of the body towards the front end 3 of the housing 2. The lid 31 has a portion 33 which overhangs the notched corner. The electrical connection pads 14 are provided on the portion 33 of the lid 31 overhanging the notched corner 32 of the body. The electrical connection pads may include one or more of a ground connection pad, a serial clock connection pad, a supply voltage connection pad and a serial data input/output pad. In the example shown, the pads are arranged in a top to bottom direction as shown in FIG. 3. The electrical connection pads may be resiliently biased towards the recess, for example by one or more springs.

The body 30 may have a datum surface 15 to contact an electrical connector 19 of a printer and resist rotation of the cartridge when the electrical connection pads 14 make contact with the electrical connector. The notched corner 32 of the body enables to receive the electrical connector between the portion 33 of the lid 31 and the datum surface 33. The datum surface 15 resists a rotational force imparted to the cartridge by the contact between the electrical connection pads 14 on the portion 33 of the lid 31 and the electrical connector 19 of the printer.

In the example shown, the datum surface 15 is a projection on a wall 16 of the body 30, similar to the arrangement of FIG. 10. Alternatively, the datum structure may be a side of the wall 16 facing towards the portion 33 of the lid, similar to FIG. 9. As a further alternative, the datum structure may be an indentation in the wall 16 of the body, similar to FIG. 11. If a datum surface is present, it need not be provided on or as part of wall 16. It can otherwise be part of or extend from the body to contact the electrical connector or other element of the printer and resist rotation of the cartridge.

In the example printable liquid supply cartridge of FIGS. 13 and 14, an integrated circuit may be housed in the portion 33 of the lid 31. It is simple to mount the integrated circuit in the lid and to attach the lid to the body. The lid may be attached to the body by welding. Additionally or alternatively, a sensor signal outputting circuit may be provided in the internal volume of the cartridge in which the printable liquid is housed. Any such integrated circuit or other electrical circuitry may communicate signals to the electrical connection pads 14 and printer as described above in respect of the earlier example cartridges.

As shown in FIGS. 13 and 14, a rib 20 may extend between the portion 33 of the lid 31 and the first wall 10 of the body. The rib 20 provides support to the portion 33 of the lid 31 overhanging the notched corner of the body. The rib 20 protects the portion 33 of the lid 31, and the electrical connection pads 14 and any additional circuitry of portion 33, from deformation and damage, as may for example be caused by incorrect handling of the cartridge. The rib may be part of the body 30. It may extend substantially perpendicularly to the portion 33. The rib 20 and the portion 33 of the lid may be joined by a weld. Alternatively, the rib 20 may be integral with the portion 33 of the lid and joined to the body, for example by a weld. A weld may comprise plastic material. The rib may also be joined to or integral with the second wall 16, if a second wall 16 is present.

In the example cartridges described above, the front end of the cartridge may be further provided with one or more lockout keys. The lockout keys may be female lockout keys to match male lockout keys provided on a slot of a printer. Example lockout keys 36 are shown in FIGS. 13 and 14. By providing different lockout keys to different printers or printer slots, full insertion of a cartridge into the wrong type of printer or slot can be avoided. For example, it can be prevented that a cartridge containing black ink be fully inserted into a slot intended for a cartridge containing yellow ink.

What is claimed is:

1. A printable liquid supply cartridge comprising:

printable liquid reservoir;

a front end including a first portion and a second portion;

the first portion including a printable liquid outlet to receive a first fluid pen, and a gas inlet, above the printable liquid outlet, to receive a second fluid pen;

a rear end;

a first side extending from the front end to the rear end;

a second side extending from the front end to the rear end, the printable liquid reservoir extending between the first side and the second side, and between the front end and the rear end;

the second portion to receive a printer data interface, the second portion including at the first side an I2C data interface that includes electrical connection pads exposed to face from the first side towards the second side, the electrical connection pads being arranged vertically and to make contact with the printer data interface at the second portion; and a sensor signal circuit in circuit with the I2C data interface, the sensor signal circuit to provide data to a printer.

2. The printable liquid supply cartridge of claim 1, wherein the support is integral with a reservoir wall that defines the first side.

3. The printable liquid supply cartridge of claim 1, wherein the second portion of the front end is above the first portion of the front end.

4. The printable liquid supply cartridge of claim 1, wherein the electrical connection pads include:

a ground connection pad, a serial clock connection pad, a supply voltage connection pad, and a serial data input/output pad.

5. The printable liquid supply cartridge of claim 4, wherein the serial data input/output pad is arranged lowest among the electrical connection pads in a vertical arrangement.

6. The printable liquid supply cartridge of claim 4, further comprising:

an integrated circuit in circuit with the I2C data interface, the integrated circuit to store a secure key for authentication with a printer; and the integrated circuit and the sensor signal circuit to communicate via the serial data input/output pad.

7. The printable liquid supply cartridge of claim 1, further comprising:

an integrated circuit in circuit with the I2C data interface, the integrated circuit to store a secure key for authentication with a printer.

8. The printable liquid supply cartridge of claim 1, the electrical connection pads exposed on an interior side of an interface support to face from the first side towards the second side, the second portion including the interface support at the first side, and the interface support including the I2C data interface.

9. The printable liquid supply cartridge of claim 8, wherein the interface support is coupled to a first wall at the first side, the printable liquid supply cartridge further comprising:

a second wall; and a recess defined between the first wall and the second wall, the recess extending less than a distance between the first side and the second side.

10. The printable liquid supply cartridge of claim 9, further comprising:

a datum surface on the second wall.

11. The printable liquid supply cartridge of claim 10, wherein the datum surface includes a projection from the second wall.

12. The printable liquid supply cartridge of claim 10, wherein the datum surface includes an indentation in the second wall.

13. The printable liquid supply cartridge of claim 10, the datum surface to inhibit rotation of the printable liquid supply cartridge during installation in a printer.

14. The printable liquid supply cartridge of claim 1, further comprising:

a lockout key corresponding to a key on a printer.

15. The printable liquid supply cartridge of claim 1, further including a plurality of lockout keys, the print liquid supply cartridge positionable on a printer based on the lockout keys.

16. The printable liquid supply cartridge of claim 15, wherein the plurality of lockout keys is structured based on a color of a liquid to be supplied by the printable liquid supply cartridge.

17. A printable liquid supply cartridge comprising:

a printable liquid reservoir between opposite first and second lateral sides of the cartridge;

a printable liquid outlet along a front of the cartridge to receive a first fluid pen to deliver the printable liquid from the reservoir to a printer;

a gas inlet lined up vertically with the printable liquid outlet along the front of the cartridge, the gas inlet to receive a second fluid pen, the gas inlet above the printable liquid outlet; and an I2C data interface above the gas inlet at the front and top of the cartridge, the I2C interface to face inwards toward an interior of a data connection space to receive a printer data connector; and electrical connection pads exposed on the I2C interface, the electrical connection pads arranged vertically, the I2C data interface supported at the first lateral side of the cartridge, and at least one electrical connection pad among the electrical connection pads is in circuit with an integrated circuit and a sensor signal circuit.

18. The cartridge of claim 17, wherein a support wall or board of the I2C data interface is continuous with this first lateral side of the cartridge.

19. The cartridge of claim 17, the electrical connection pads comprising:

a ground connection pad;

a serial clock connection pad;

a supply voltage connection pad; and a serial data input/output pad, the serial data input/output pad is arranged lowest among the electrical connection pads in a vertical arrangement and is in circuit with the integrated circuit and the sensor signal circuit.

20. The cartridge of claim 17, further comprising:

a datum surface opposing the I2C data interface, the datum surface to inhibit rotation of the interface during installation in a printer.

* * * * *